United States Patent Office 2,951,748
Patented Sept. 6, 1960

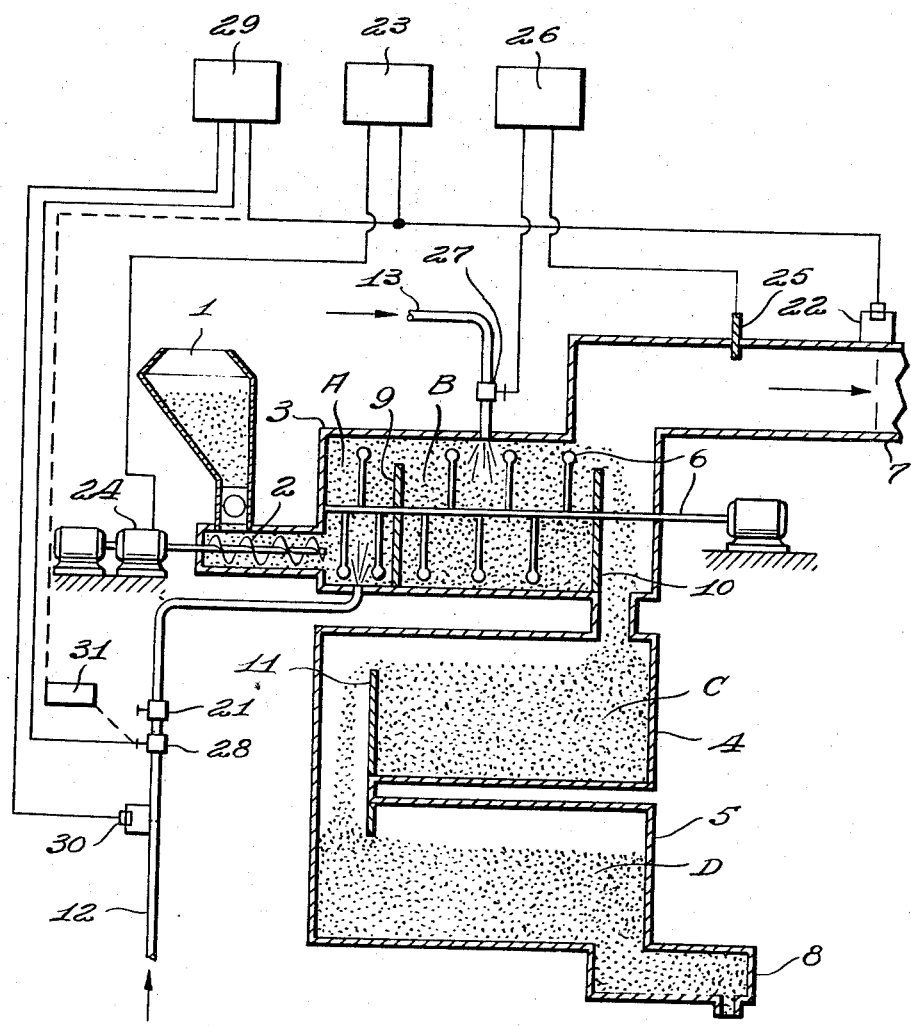

2,951,748

ACETYLENE GENERATION

Myron A. Murphy and Bernard Vincent Donnelly, both of Shawinigan Falls, Quebec, Canada, assignors to Shawinigan Chemicals Limited, Shawinigan Falls, Quebec, Canada, a corporation of Canada Filed Dec. 16, 1957, Ser. No. 702,840

5 Claims. (Cl. 48—38)

This invention relates to continuous processes for producing a gas by exothermic reaction of a solid with a liquid, in particular acetylene by reacting calcium carbide with water, and preferably includes the simultaneous recovery of the residual solid in usable form. The invention has particular utility as applied to processes in which the water to solid ratio is such that a comparatively dry hydrated solid is recovered.

Methods and apparatus have been disclosed in U.S. Patents 2,343,185 and 2,415,328 for the generation of a gas from a solid by reacting it with liquid, and the recovery of residual solid in comparatively dry hydrated form, with various controls for automatic operation, the whole being exemplified by the generation of acetylene from calcium carbide to yield dry lime hydrate. Although some of these methods of control have operated with some degree of satisfaction, the system of controls as a whole has required more manual adjustment than is acceptable in commercial operation.

An object of this invention is to provide automatic control of the operating variables of the foregoing processes so that both (a) the rate of gas production and (b) the temperatures of the reaction and of the gas discharged from the process can be maintained under control and preferably substantially uniform, regardless of ordinary variations in the particle size and quality (gas yield and reactivity) of the solids fed to the process. As a consequence of the maintenance of a uniform temperature of the gas discharged from the process, the moisture content of the residual solids discharged from the process is found inherently to remain substantially uniform. An even more important consequence of the maintenance of uniform temperature of reaction is that the proportions of the impurities hydrogen sulphide and phosphine, formed simultaneously with the acetylene from commercial calcium carbide, are kept uniform and controlled within acceptable limits, thus facilitating ready and uniform removal of the impurities from the acetylene. It has been shown by Dr. E. Zorn (Permanent International Committee on Acetylene, Report, "Dry Lime Generators for Acetylene Production" Oslo, Norway, 9 July 1954), and Hauser (Mitt. Chem. Forsch. Inst. Wirtsch. Osterr. 1954, No. 2, p. 31–33) that increasing temperature of generation of acetylene from calcium carbide decreases the volume percentage of phosphine in the gas produced and increases the volume percentage of hydrogen sulphide. Because phosphine is harder to remove from acetylene gas than is hydrogen sulphide, it is preferable to conduct acetylene generation at as high a uniform temperature as is readily practicable, thus forming a minimum practicable proportion of phosphine, and subsequently to remove the hydrogen sulphide.

The invention accordingly consists of a continuous process for producing acetylene and substantially dry lime hydrate by the exothermic reaction between calcium carbide and water, comprising (1) feeding together a continuous supply of calcium carbide and a first supply of water into the first reaction zone of a generating chamber having more than two reaction zones to form a charge, (2) continuously agitating the charge in said reaction zones to cause rapid mixing and interaction of the constituents, said feeding and agitating serving also continuously to move the charge from the first zone through subsequent zones of the chamber, (3) regulating the rate of feed of calcium carbide in automatic response to a selected condition which is dependent on the rate of acetylene generation to provide a controlled rate of generation of acetylene, (4) regulating the first supply of water in proportion to the acetylene gas to be produced and effectively to react with the calcium carbide completely and to absorb part of the heat of reaction, (5) continuously adding a second supply of water to the charge in a reaction zone subsequent to the first reaction zone, (6) regulating the second supply of water in automatic response to changes in the temperature of the product gas to absorb the remainder of the heat of reaction and produce a gas of substantially uniform temperature and a residual lime hydrate of substantially uniform moisture content, (7) continuously removing product gas from the generating chamber and (8) continuously discharging residual lime hydrate from the reaction zone remote from the supply of calcium carbide.

The invention also consists of apparatus for the production of acetylene and substantially dry lime hydrate by the reaction of calcium carbide and water comprising (1) a generating chamber having partitions to form more than two communicating reaction zones therein, (2) means for continuously feeding solid calcium carbide to the first reaction zone of said chamber, (3) means for continuously feeding a first supply of water to the first reaction zone of said chamber thereby to form a reacting charge with said carbide, (4) agitating means to agitate the charge in said reaction zones continuously, said carbide feeding and agitating means serving also continuously to move the charge from the first zone through the subsequent zones of the chamber, (5) a discharge conduit leading from said chamber to remove the generated gas therefrom, (6) solid control means for regulating the rate of feed of calcium carbide, (7) measuring and transmitting means, at least one of which is responsive to a selected condition which is dependent on the rate of acetylene generation, acting on said solid control means to provide a controlled rate of generation of acetylene, (8) first liquid control means for regulating the rate of flow of said first supply of water, (9) means for continuously feeding a second supply of water to a subsequent reaction zone of said chamber, (10) second liquid control means for regulating the flow of said second supply of water, (11) means responsive to the temperature of the generated gas adapted to act on said second liquid control means thereby to feed the second supply of water in response to the temperature of said gas, and (12) means for discharging residual lime hydrate from the reaction zone remote from the first reaction zone.

The foregoing Patent 2,415,328 has described a process and apparatus for regulating the relative proportions of solid and a single liquid feed in response simultaneously to changes in the consistency of the mixture and in the temperature of the gas produced. The single liquid feed, exemplified by water for reaction with calcium carbide to form acetylene, was described as "feeding (with) the carbide . . . initially into one zone . . . (with) means to prevent their becoming isolated from one another." The earlier Patent 2,343,185 indicated the preference for addition to the initial reaction zone of all the water required for the reaction, and also indicated that, for example in emergencies, water could be added to subsequent zones of reaction. It was suggested that for such conditions water could be added through sprays or other inlets placed at subsequent locations in the generating chamber.

In accordance with the present invention, it has been found essential for the most efficient and convenient operation of acetylene dry generators of the type described in the foregoing patents, to supply the water by means of two substantially continuous sources located at separate points, in an initial and in a subsequent zone respectively in the generator, and to maintain the first of these supplies at a rate proportioned to the carbide effectively to react with the carbide completely and to absorb part of the heat of reaction, while adjusting the rate of the second supply in response to changes in the temperature of the gas leaving the generator to absorb the remainder of the heat of reaction and produce a gas of substantially uniform temperature and a residual lime hydrate of substantially uniform moisture content. The positioning of a second continuous water supply at a location removed from the first water supply has been found to be a critical factor in achieving proper automatic control of acetylene dry generators, because it has been found that changes in the demand for water do not become apparent (as evidenced by variation in the temperature of the product gas) immediately upon the occurrence of a change in the quality and/or average particle size of carbide being fed into the initial zone of the generator, but only become apparent a significant time later when the carbide of different quality has moved well into the generator away from the initial zone into which most of the water is fed. With the balance of the water being added continuously at a point removed from the initial zone, as in this invention, it is thus possible to regulate the over-all water supply in response to changes in the quality and/or average particle size of the carbide, and to regulate it at a time and place where the regulation is effective to compensate for changes in the carbide which occurred some significant time previously.

It has been indicated previously that it is preferable to conduct acetylene generation at as high a uniform temperature as practicable. The temperature of the generated gas, as it leaves a generator with the vapor of water evaporated in absorbing the heat of the generation reaction, is a measure of the temperature of generation; hence it is desirable to keep the temperature of the generated gas at as high a value as possible consistent with ensuring that there is sufficient water to react with the calcium carbide completely. In practice it is found preferable, convenient, and practicable to operate dry generators according to this invention with the temperature of the generated gas as it leaves the generator at the maximum value of about 212° F. If a generator is operated to produce gas having a temperature about five or more degrees higher than this value, there is danger that pieces of carbide will pass through the generators unslaked, i.e. the carbide will not be completely reacted. Further, if a generator is operated to produce gas at a temperature about five or more degrees lower than this value, the hydrated lime produced may contain an undesirably large proportion of water. Hence in preferred embodiments of this invention, the rate of feed of the second supply of water is regulated to maintain the temperature of the generated gas, as it leaves the generator, in the range between 208 and 216° F. and most preferably about 212° F. This regulation can be achieved of course by variation of the second water supply in response to deviations of the gas temperature from some other value at a point other than the gas exit point of the generator.

In one species of the invention, the first water supply is set and maintained at a substantially uniform rate, selected in accordance with a specific rate of acetylene generation desired, and the second water supply is regulated at a variable rate adjusted to provide the remainder of the water required by the process to maintain a substantially uniform temperature in the gas produced. By maintaining the first water supply rate at a substantially uniform value proportioned to a specific rate of acetylene generation and adequate to provide the largest part of the water requirements of the process, and regulating the second supply of water in response to changes in the demand for water by the process (arising from variations in the quality of the carbide feed, etc.) it is possible to obtain excellent adjustment and regulation of the overall water supply, and also to vary the water supply at a point removed from the initial reaction zone and in the zone where the variation is required in order to maintain effective control over the temperature of a significant part of the reaction and over the residual moisture content of the residual lime hydrate.

A particular refinement of the foregoing species of the invention further includes means for abruptly interrupting the first water supply at the onset of a condition which might result in flooding of the generator with excess water, as hereinafter described.

In another species of the invention, the first water supply is continuously automatically regulated and adjusted to a rate proportioned to the rate of generation and discharge of acetylene from the process and adequate to provide a major proportion of the water requirements of the process while the second water supply is regulated to supply the remainder of the water required for the process to maintain a substantially uniform temperature in the gas produced.

In the accompanying drawing, there is illustrated in diagrammatic form a suitable apparatus for carrying out the invention. This apparatus, shown partly in section, is based on the acetylene dry generator apparatus shown in previously mentioned U.S.P. 2,415,328, but excludes the system of controls used therein. The elements of the generator include a hopper 1, or preferably a three hopper system as disclosed in the aforementioned patent, to provide a continuous reservoir of carbide for supplying the generator, a feed screw 2 for moving carbide from the hopper into a first zone A of the three drum generator chamber, the drums being 3, 4, and 5, and the subsequent reaction zones therein being B, C, and D, the boundaries between the reaction zones being established by the partition walls 9, 10, and 11 over each of which the charge passes as it moves through the generator, a water supply line 12 to provide a first supply of water to the first reaction zone, a water supply line 13 to provide a second supply of water to a subsequent reaction zone, agitating means 6 in chamber 3 with similar means in chambers 4 and 5 not shown, a gasofftake line 7 to conduct product gas from the generator to scrubbing, cooling and/or storage facilities, not shown, and lime hydrate withdrawal means 8, partly shown, to remove lime hydrate from the generator. The foregoing elements and the combination of them are all substantially completely described in the earlier mentoned patents.

A novel combination of elements that provides automatic control of the rate of gas production and of the temperature of the gas produced, and consequently of the moisture content of the residual lime hydrate, in accordance with one embodiment of the invention, comprises the following. A manually adjustable valve 21 in the first water supply line 12 regulates the rate of flow of the first water supply, and can be set at any desired position to hold the first water supply within a range proportioned to the calcium carbide effectively to react with the calcium carbide completely and absorb part of the heat of reaction. A measuring and transmitting means, indicated conventionally at 22, measures a convenient factor which is proportional to the rate of production of gas. This factor can conveniently be, for example, the pressure drop through a section of the gas outlet line, particularly one after any scrubbing and cooling equipment through which the gas passes en route from the generator to storage or utilization point. A pressure sensitive element would be used as the measuring means when pressure drop is the factor utilized. Another suitable but less sensitive factor is the temperature of cooling water circulating in cooling equipment used to cool the gas. This measuring and transmitting means is used to operate a controller 23 which in turn controls the rate of feed of carbide to the generator by regulating the speed of a variable speed hydraulic drive 24 turning the feed screw 2. With this means of control, the rate of feed of carbide is varied in response to changes which occur in the rate of gas production so as to maintain the latter rate substantially constant. A measuring and transmitting means 25 in the gas-offtake line 7 responds to temperature changes in the gas discharged from the generator and operates a controller 26 which in turn controls valve 27 in the second water supply line 13. With this means of control, the rate of feed of the second supply of water is varied in response to changes in the temperature of the gas discharged from the generator so as to maintain this temperature substantially constant by increasing the rate of feed of water when the gas temperature tends to rise and decreasing the rate when the temperature tends to fall. By feeding and regulating a second supply of water in this manner, the moisture content of the lime hydrate discharged from the generator also is maintained at a substantially uniform value.

A particular refinement of the foregoing embodiment of the invention includes, in addition to the elements mentioned above, a means for automatically abruptly stopping the first water supply, for example valve 28, when the rate of gas production falls below a preselected value, which can be a preselected proportion of the normal rate of gas production. As shown in the drawing, the valve 28 in water supply line 12 can be controlled by a direct acting relay 31, responsive to the measuring means 22, which completely closes valve 28 whenever the measuring means 22 indicates that the rate of gas production has fallen below the preselected value, and completely reopens it when the gas production rate rises above the preselected value. The special need for this refinement will be described hereinafter.

Another, more versatile, embodiment of the invention also is illustrated in the drawing, but is different from the former embodiment in the following respects. The manually adjustable valve 21 in line 12 is set wide open, or can be eliminated from line 12 for this embodiment of the invention. The measuring and transmitting means 22, as well as operating the controller 23, also is used to assist in operating a ratio controller 29 which in turn controls the rate of feed of the first water supply by regulating the instrument operated valve 28. This valve is regulated to provide a first supply of water proportioned to the rate of feed of calcium carbide and responsive to the rate of generation of acetylene as measured by means 22, i.e., responsive to the same measuring and transmitting means that acts on the solid control means. Measuring means, indicated conventionally at 30, measures a factor proportional to the rate of flow of the first water supply, usually a convenient pressure drop in a section of the water supply line 12, and indicates changes in the rate of feed of the first supply of water. The measuring means 30 works in combination with the measuring means 22 to operate the ratio controller 29. In this manner the rate of flow of the first water supply is controlled by valve 28 in a selected ratio to the rate of generation of acetylene to provide water to react with the calcium carbide completely and absorb part of the heat of reaction. Thus, with this embodiment of the invention, the rate of feed of carbide is varied in response to changes which occur in the rate of gas production so as to maintain the latter rate substantially constant at a predetermined value selected by a setting of the controller 23 by increasing the rate of feed of carbide when the rate of gas production tends to fall and decreasing the rate of feed of carbide when the rate of gas production tends to rise; the rate of feed of the first supply of water also is varied in response to changes which occur in the rate of gas production so as to maintain the first water supply rate in a substantially constant ratio to the rate of gas production, this predetermined ratio being selected by a setting of ratio controller 29; the rate of feed of the second supply of water is varied in response to changes in the temperature of the gas discharged from the generator so as to maintain this temperature substantially constant by increasing the rate of feed of water when the temperature tends to rise and decreasing the rate when the temperature tends to fall. With this embodiment of the invention there is no need for the relay 31 to act on valve 28 in the first water supply line, the valve being regulated instead by ratio controller 29 to prevent an oversupply of water to the generator.

It has been indicated previously in the art that granular calcium carbide used in acetylene dry generators varies widely in particle size and quality, i.e. gas yield per pound of carbide. The method and system of control for dry generators according to this invention provide necesary compensation for variation in these factors. Thus when the balanced operating conditions of a generator are subject to a change in average particle size of the carbide being fed, for example a sudden change to smaller sized more closely packed particles forming a denser feed, there is a consequent sudden increase in the rate of feed of carbide to the generator in weight per unit time; this increased rate of feed persists until the denser feed has worked its way into the generator and caused an increase in the rate of acetylene generation, which registers as an increase on measuring means 22 and initiates a decrease in the speed of the feed screw 2. Before the decrease in the speed of the feed screw is effected however, a quantity of the denser feed has entered the generator at the former higher rate of feed, and the water requirement of this feed is greater than the normal water requirement before the change in carbide feed occurred. Consequently the temperature of the generated gas tends to rise, and the increase in temperature of the generated gas initiates an increase in the rate of feed of the second water supply which supplies water in a zone subsequent to the initial zone of the generator which the first part of the denser feed will have passed by the time the temperature rise has occurred and the increase in the second water supply initiated. This increase in the second water supply precludes carbide from passing through the generating chamber unslaked. Similarly when there is a sudden change to larger carbide particles forming a less dense feed, there is a consequent sudden decrease in the rate of feed of carbide, followed by a decrease in the rate of generation of acetylene which registers as a decrease on measuring means 22 and initiates an increase in the speed of the feed screw 2. Until the feed screw has adjusted to the new speed, the water supply, if continued at a uniform rate, would be more than required for the reaction and removal of heat of reaction, and would tend to lower the temperature of the generated gas and increase the proportion of residual moisture in the lime hydrate; however the decreasing temperature of the generated gas initiates a decrease in the rate of feed of the second water supply. In this manner the temperature of the gas and the residual moisture content of the lime hydrate are maintained uniform under changing conditions of average particle size of carbide feed.

There are abnormal conditions which can occur in the operation of the acetylene dry generators to which the first previously described embodiment of the present invention are applied, which conditions the said embodiment of the invention can be adapted to compensate for, to prevent oversupply of water to the generators under the conditions, thus preventing a generator charge from becoming a heavy soggy wet mass which stalls the stirring mechanisms. One example of such abnormal conditions is the condition where a hold-up occurs in the carbide feed to the generator, due to bridging of the carbide in a storage hopper above the feed screw or jamming of carbide at or around the feed screw; another example is the condition wherein the quality of the carbide feed drops to a very low value yielding only a low volume of gas per unit weight, due to contamination of the feed with foreign material or merely to the low grade of the carbide. These conditions frequently cause a large and sudden drop in the rate of acetylene generation and consequently in the rate of gas production. The change in the demand for water is accordingly large and sudden, usually larger and more rapid than can be provided for by the combination of the gas temperature measuring means and the related control means in the second water supply.

The large decrease in demand for water is provided for in the particular refinement of the first embodiment of the invention previously described, wherein the first water supply, normally running at a uniform preset rate, is completely stopped whenever the rate of gas production falls below a preselected value. By this means, one can quickly preclude an oversupply of water or flooding in the generator under conditions in which the demand for water greatly decreases.

It should be noted that the supply of solid material (carbide) is not purposely interrupted under the foregoing conditions. Because it is desired to maintain a uniform, and preferably maximum, rate of gas production for the most efficient operation of a generator, the supply of carbide to the generator is maintained as continuous as possible, to achieve the desired rate. Interruption of the water supply to the generator without interruption of the feed of solids does not create a dangerous condition in the generator, because the agitating means can readily continue to stir the charge when it contains less than the normal amount of water. However, interruption of the feed of solids to the generator without interruption of the water supply produces a wet condition in the generator in which the charge becomes a sticky heavy wet mass which the agitators have difficulty stirring and which usually stalls the stirrers, requiring the generator to be shut down, purged, and cleaned out manually, an expensive and difficult operation. It is thus a paramount advantage of this invention that oversupply of water to the generator under abnormal conditions can be precluded.

The embodiments of the invention hereinbefore described were arranged to produce preset or fixed uniform rates of gas generation. It will be apparent to those skilled in the arts of automatic controls and instrumentation that embodiments of the invention in which the first water supply is continuously automatically regulated and adjusted to a rate proportioned to the rate of generation and discharge of acetylene may be equipped to produce multiple uniform rates of gas generation which are proportional to a variable condition, such as, for example, a variable demand for acetylene. Thus, using the embodiment illustrated in Figure 1 for example, the controller 23, instead of being set to control the rate of feed of carbide to provide a fixed uniform rate of gas generation, can be equipped with pneumatic set so that the uniform rate of gas generation provided is variable and responsive to variations in a selected variable condition such as, for example, the demand for acetylene as indicated by an element measuring the level of a gasometer providing temporary storage for the generated gas, i.e. surge capacity in a gas generating system. The controller 23 is thus acted on by two measuring and transmitting means, the first of which is responsive to variations in the rate of gas flow and, in effect, regulates the carbide feed to provide a selected rate of gas flow, and the second of which selects the gas flow in proportion to the demand for acetylene and regulates the controller to provide the selected flow.

Numerous other variations and modifications to the invention can be made, as will be obvious to those skilled in the art. For example, for the first supply of water, use can be made of the aqueous slurry of lime hydrate produced in a gas scrubbing tower connected with the generator, as disclosed in earlier patents. Preferably water alone, and not aqueous slurry, is used for the second supply of water in a generator. Water alone is preferred for the second supply because the second supply of water is much smaller than the first, it is preferably sprayed into the generator, and water is more easily regulated than slurry.

The proportions of the total water supply that are provided by the first and second water supplies are not critical, and can vary over a considerable range. Obviously the first water supply should be the larger, and it can conveniently constitute 75-98% of the total water supply, and most preferably constitutes about 90% of the total water with the remaining 10% being provided by the second supply. Obviously the proportion varies as the second supply fluctuates with changing demand while the first supply remains at a uniform controlled flow rate, depending on the rate of acetylene generation.

For convenience and ease of restarting a dry generator after any temporary stoppage, it is preferable that all valves be arranged to close automatically under any emergency condition which may arise and cause a stoppage, such as, for example, failure of electric power supply to the unit, or failure of the air supply to air-operated instruments. With such arrangement, the likelihood of flooding the generator with excess water is precluded.

Numerous kinds of commercially available equipment can be utilized for the components of the novel combination of apparatus used for the invention. For example in an embodiment as illustrated in the drawing, the temperature responsive controller 26 can be a Taylor Fulscope recording receiving controller with adjustable sensitivity, as supplied by the Taylor Instrument Company, controlling a Foxboro needle type control valve represented by valve 27, as supplied by Foxboro Company. The gas production rate measuring and transmitting means 22 can be a Foxboro Bell Type No. 9 indicating differential pneumatic transmitter, as supplied by the Foxboro Company and to which controller 23 is responsive; controller 23 can be a Taylor Fulscope recording receiving controller with adjustable sensitivity and reset, regulating the speed of feed screw 2. Valve 28 can be a Annin Domotor control valve Model 1650 supplied by Annin Company. Ratio controller 29 can be a Taylor Fulscope recording ratio controller with adjustable sensitivity and reset, responding to flow measuring means 22 and 30, which latter means can be a Foxboro type 13A Differential Pressure transmitter cell. Temperature responsive means 25 can be a Moore Model 33B Nullomatic temperature transmitter as supplied by Moore Products Company. Relay 31 can be a Pneumatic Precision Relay Model 67-100 as supplied by Moore Products Company.

As different embodiments of this invention may be made without departing from the spirit and scope thereof, it is to be understood that the invention is not limited to the specific embodiments disclosed except as defined in the appended claims.

What is claimed is:

1. In a continuous process for producing acetylene and substantially dry lime hydrate by the exothermic reaction between calcium carbide and water, comprising (1) feeding simultaneously a continuous supply of calcium carbide and a first supply of water into the first reaction zone of a generating chamber having more than two reaction zones to form a charge, said first supply of water being insufficient to absorb all of the heat of the reaction with the carbide, (2) continuously agitating the charge in said reaction zones to cause rapid mixing and interaction of the constituents, said feeding and agitating serving also continuously to move the charge from the first zone through subsequent zones of the chamber, (3) regulating the rate of feed of calcium carbide in automatic response to variations in the rate of flow of acetylene from the generating chamber to provide a uniform rate of generation of acetylene, (4) continuously adding a second supply of water to the charge in a reaction zone subsequent to the first reaction zone, said second supply of water being make-up to complete the absorption of the heat of the reaction, (5) continuously removing product gas from the generating chamber and (6) continuously discharging residual lime hydrate from the reaction zone remote from the supply of calcium carbide the improvement which comprises maintaining the rate of feed of the first supply of water at a substantially uniform value proportioned to the selected rate of acetylene generation to be achieved, and regulating the rate of feed of the second water supply in automatic response to changes in the temperature of the cumulative product gas collected from all the reaction zones, as the cumulative product gas leaves the generating chamber, to provide the remainder of the water required by the process to maintain a substantially uniform temperature in the gas produced.

2. In a continuous process for producing acetylene and substantially dry lime hydrate by the exothermic reaction between calcium carbide and water, comprising (1) feeding simultaneously a continuous supply of calcium carbide and a first supply of water into the first reaction zone of a generating chamber having more than two reaction zones to form a charge, said first supply of water being insufficient to absorb all of the heat of the reaction with the carbide, (2) continuously agitating the charge in said reaction zones to cause rapid mixing and interaction of the constituents, said feeding and agitating serving also continuously to move the charge from the first zone through subsequent zones of the chamber, (3) regulating the rate of feed of calcium carbide in automatic response to variations in the rate of flow of acetylene from the generating chamber to provide a controlled rate of generation of acetylene, (4) continuously adding a second supply of water to the charge in a reaction zone subsequent to the first reaction zone, said second supply of water being make-up to complete the absorption of the heat of the reaction, (5) continuously removing product gas from the generating chamber and (6) continuously discharging residual lime hydrate from the reaction zone remote from the supply of calcium carbide the improvement which comprises continuously regulating and varying the rate of feed of the first supply of water in automatic response to variations in the rate of flow of acetylene from the generating chamber to provide a major proportion of the water requirements of the process, and regulating the rate of feed of the second water supply in automatic response to changes in the temperature of the cumulative product gas collected from all the reaction zones, as the cumulative product gas leaves the generating chamber, to provide the remainder of the water required by the process to maintain a substantially uniform temperature in the gas produced.

3. A process as claimed in claim 2 in which the rate of feed of calcium carbide is regulated to provide a fixed uniform rate of generation of acetylene.

4. A process as claimed in claim 2 in which the rate of feed of calcium carbide is regulated to provide a uniform rate of generation of acetylene proportional to the demand for acetylene.

5. An apparatus for the production of acetylene and substantially dry lime hydrate by the reaction of calcium carbide and water comprising (1) a generating chamber having partitions to form more than two communicating reaction zones therein, (2) means for continuously feeding solid calcium carbide to the first reaction zone of said chamber, (3) means for continuously feeding a first supply of water to the first reaction zone of said chamber thereby to form a reacting charge with said carbide, (4) agitating means to agitate the charge in said reaction zones continuously, said carbide feeding and agitating means serving also continuously to move the charge from the first zone through the subsequent zones of the chamber, (5) a discharge conduit leading from said chamber to remove all the generated gas therefrom, (6) solid control means for regulating the rate of feed of calcium carbide, (7) measuring and transmitting means acting on said solid control means to provide a controlled rate of generation of acetylene, said measuring and transmitting means comprising (a) a pressure-sensitive element responsive to the pressure drop in the flow of acetylene through a section of the discharge conduit and (b) an element responsive to the demand for acetylene, (8) first liquid control means comprising an instrument-operated valve responsive to the said pressure-sensitive element acting on the solid control means for regulating the rate of flow of said first supply of water in proportion to the rate of acetylene generation to be achieved, (9) means for continuously feeding a second supply of water to a subsequent reaction zone of said chamber, (10) second liquid control means for regulating the flow of said second supply of water, (11) means responsive to the temperature of the generated gas in said discharge conduit at a point of discharge of the cumulative product gas adapted to act on said second liquid control means thereby to feed the second supply of water in response to the temperature of said gas, and (12) means for discharging residual lime hydrate from the reaction zone remote from the first reaction zone.

References Cited in the file of this patent
UNITED STATES PATENTS

| | | |
|---|---|---|
| 2,343,185 | Holm | Feb. 29, 1944 |
| 2,415,328 | Andersen et al. | Feb. 4, 1947 |
| 2,701,188 | Ritter et al. | Feb. 1, 1955 |